United States Patent [19]

Johnson

[11] Patent Number: 4,656,975
[45] Date of Patent: Apr. 14, 1987

[54] ENGINE COOLING SYSTEM

[76] Inventor: Kenneth A. Johnson, 15236 Tacoma St., Detroit, Mich. 48205

[21] Appl. No.: 725,972

[22] Filed: Apr. 22, 1985

[51] Int. Cl.⁴ ............................................. F01P 1/02
[52] U.S. Cl. ............................. 123/41.68; 123/41.69; 60/605
[58] Field of Search ............... 123/41.68, 41.67, 41.69, 123/41.82 R; 60/605

[56] References Cited

U.S. PATENT DOCUMENTS

| | | | |
|---|---|---|---|
| 719,326 | 1/1903 | Gross | 123/41.68 |
| 1,035,391 | 8/1912 | Simpson | 123/41.68 |
| 2,209,078 | 7/1940 | Gettinger | 123/41.68 |
| 3,089,471 | 5/1963 | Epenschied | 123/41.82 R |
| 3,315,652 | 4/1967 | Ries et al. | 123/41.82 R |

Primary Examiner—Michael Koczo
Assistant Examiner—Cole Richard R.

[57] ABSTRACT

Mechanism for cooling individual cylinders of an engine, using low pressure air bled from an engine supercharger. Special passage structures are provided to guide and confine the air during its passage across external surfaces of the engine cylinders. After performance of its coolant function, the air may be passed into the supercharger outlet passage. The mechanism is especially useful for cooling engines in armored military vehicles in that a minimum number of air openings are formed in the armored hull structure; engine cooling is achieved without sacrificing the integrity of the armor envelope.

1 Claim, 1 Drawing Figure

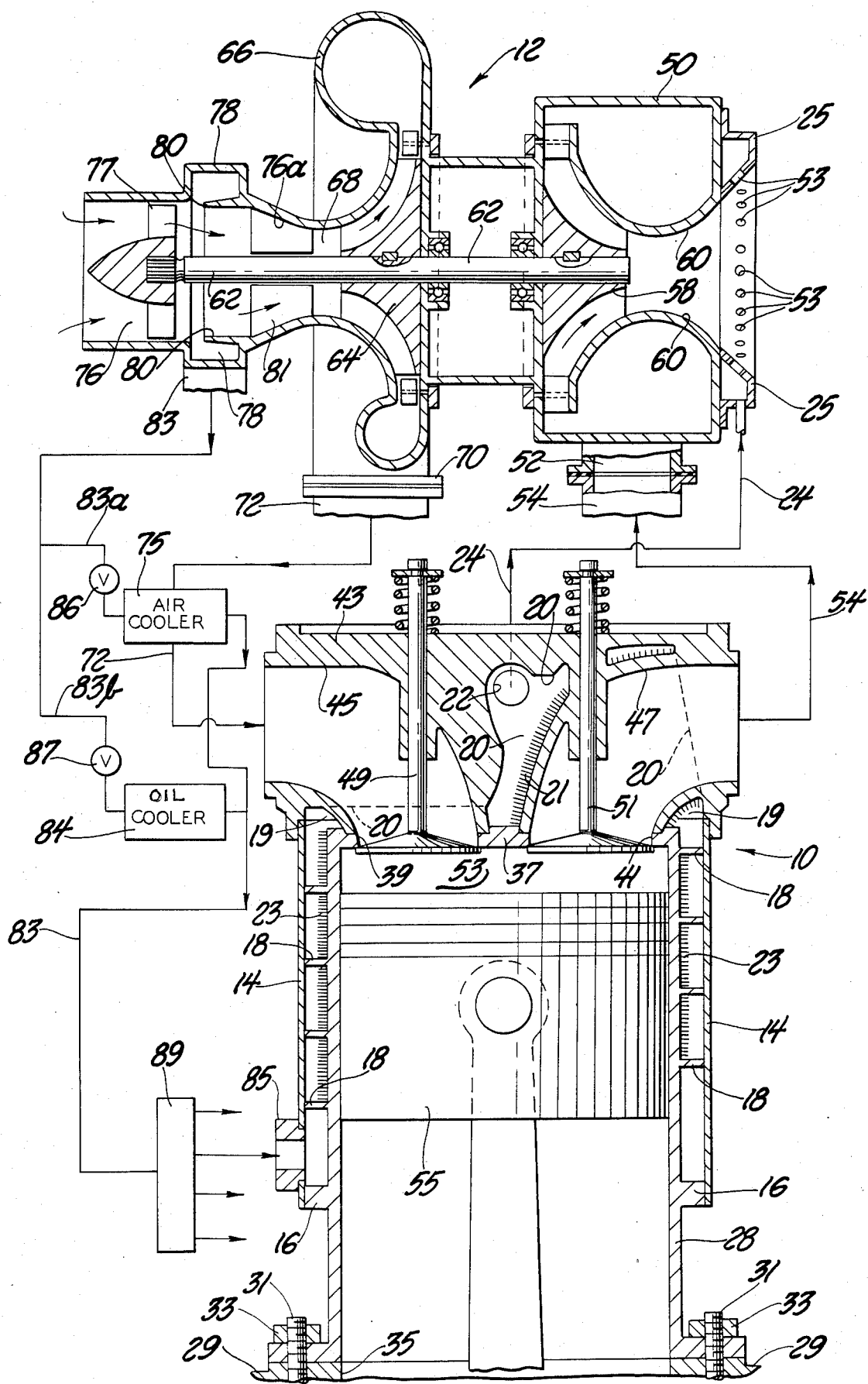

ENGINE COOLING SYSTEM

GOVERNMENT INTEREST

The invention described herein may be manufactured, used, and licensed by or for the Government for governmental purposes without payment to me of any royalty.

BACKGROUND AND SUMMARY OF THE INVENTION

This invention relates to a mechanism for cooling engines, especially engines used in military tanks.

Military tanks are commonly powered by diesel engines having a number of cylinders, e.g., twelve cylinders arranged in two banks of six cylinders per bank. The tanks usually weigh several tons, e.g., between forty and sixty tons. Accordingly, the propulsion engines are required to have large power outputs, e.g., 1,200 horsepower. The individual engine cylinders have relatively large diameters and stroke lengths, e.g., approximately four inches.

The above factors result in large engine cooling loads. Commonly, water is used as the engine coolant. However, the heated water must, in turn, be cooled before recirculation through the coolant passages in the engine. To accomplish such cooling of the water, it is common to pass the heated water through radiators. Engine-driven fans are located in alignment with the radiators to draw ambient air through the radiators for effecting a coolant action on the water within the radiator.

Even though the engines may be water-cooled, the ultimate (final) cooling action is accomplished by the fan-induced air flow through the radiators. Relatively large air quantities are required.

One existing military tank is powered by an air-cooled engine, designated as the AVDS-1790. That particular engine is equipped with two large fans located on the engine centerline above the engine cylinders; each cylinder has a large number of external cooling fins on its cylinder head area. The two large fans draw ambient air upwardly across the external fins to cool the individual cylinders. Large quantities of air are required.

Military tanks differ from conventional automobiles and trucks in that tank hulls are usually constructed with a minimum number of openings or slots in the hull walls; design efforts are made to protect the human occupants and power plant from enemy projectiles, mines, grenades, etc. The aim is to provide as few openings as possible in the hull-turret envelope, and to make any such openings as small as possible areawise.

The presence of large air-water radiators in military tanks is a disadvantage from the standpoint that such radiators subtract from the armored wall area and also from the standpoint that if the radiators should be pierced by an enemy projectile or fragment, the resultant water leakage out of the radiators will cause failure of the cooling systems and overheating of the associated engines.

The presence of large fans in military tanks is similarly disadvantageous in that the associated air flow openings subtract from the armored wall area. In some cases, ballistic grilles are placed across the air flow openings to intercept enemy projectiles or munition fragments. However, such grilles add to the vehicle weight and cut down on the air flow. It would be desirable to eliminate the need for ballistic grilles, or to at least reduce the required face area of such grilles.

Diesel engines in military tanks are usually supercharged in order to provide increased power for special situations, e.g., uphill movements and/or quick accelerations during enemy engagements. My present invention provides an engine cooling system that utilizes a conventional supercharger to provide a source of engine coolant (air). In my proposed cooling system, air is diverted from the supercharger through finned coolant passages surrounding the engine cylinders. After passage across the engine cylinders, the heated coolant is returned to the supercharger for discharge out of the tank (vehicle).

A principal advantage of my invention is the fact that no radiators or auxiliary fans are required. The only interruptions (openings) in the vehicle hull are those necessary for in-flow of combustion air to the engine (through the compressor portion of the supercharger) and outflow of exhaust gases from the engine (through the turbine portion of the supercharger).

Another possible advantage of my invention is achievement of coolant air flow at the expense of a lessened pressure drop (compared to conventional air-cooled arrangements or water-cooled arrangements). The lessened pressure drop is possible due to a greatly reduced air flow requirement for coolant purposes. In my proposed arrangement, the coolant air is caused to flow through passages running through the engine in close proximity to the combustion chambers and exhaust passages; the coolant air experiences a much greater temperature increase than the coolant in conventional engine cooling arrangements.

The relatively large temperature rise in the coolant air stream means that only a relatively small quantity of air is required to achieve a given cooling action (considerably smaller than either air or water cooled systems). Smaller air quantities (mass flow rates) translate into relatively small pressure drops and small power expenditures.

Another possible advantage of my invention is a saving in space devoted to the engine cooling hardware. Such a saving results from the fact that no space is required for radiator(s) or fans and fan drive systems.

THE DRAWING

The single FIGURE diagrammatically illustrates an engine incorporating my invention.

THE DRAWING IN GREATER DETAIL

The single FIGURE shows a vehicle power plant that includes a piston engine 10 and supercharger 12. The drawing shows the engine as having only one piston; in practice, the engine would have a number of piston-cylinder combinations, e.g., twelve piston-cylinder units.

The relationship of the supercharger to the engine is conventional. Hot exhaust gases from the engine drive a turbine in the supercharger. The turbine in turn drives a compressor that supplies pressurized air to the engine.

In my proposed arrangement, the supercharger is modified in that a fan means is provided at the compressor inlet; the shaft of the supercharger is extended to act as a drive mechanism for the fan means. Part of the air discharged from the fan means is diverted from the compressor through conduits leading to cylinder coolant passages in the engine. After travel through the coolant passages, the heated air is passed through other conduits leading to the engine exhaust duct system.

The heated coolant (air) escapes from the vehicle with the engine exhaust gases.

ENGINE CONSTRUCTION

The engine is of conventional design. It comprises a cylinder 28 affixed to an engine crankcase 29 by means of studs 31 and nuts 33. In a typical V engine, the crankcase would be an elongated structure having two banks of openings 35 in its upper faces (four or six openings per bank). A cylinder 28 would be bolted onto the crankcase in alignment with each opening 35.

Cylinder 28 includes an upper end wall 37 having an air intake opening 39 and an exhaust gas opening 41 therein. An individual cylinder head member 43 is suitably affixed to cylinder 28.

Air is admitted to the cylinder through an air intake passage 45. Products of combustion are exhausted from the cylinder through an exhaust passage 47. Poppet valve 49 controls inflow through passage 45; poppet valve 51 controls outflow through passage 47. Combustion within chamber 53 causes piston 55 to move downwardly in cylinder 28.

As noted above, the engine is of conventional design (except for the hereinafter-described cooling system).

SUPERCHARGER CONSTRUCTION

Supercharger 12 comprises a turbine housing 50 having an inlet opening 52 connected to an exhaust passage 54 suitably connected to engine exhaust passage 47.

A vaned turbine wheel 58 is located within housing 50 for rotation by the hot engine exhaust gases as they flow from turbine inlet opening 52 to outlet opening 60. Turbine 58 is connected to a rotary shaft 62 that extends through a vaned impeller 64 located within a compressor housing 66. Rotation of impeller 64 causes raw air to undergo centrifugal compression while moving from compressor inlet opening 68 to compressor outlet opening 70.

The compressor outlet connects with a duct means 72 that eventually discharges to engine intake passage 45. Duct means 72 includes an air cooler 75, whose function is to reduce the temperature of the compressed air before its admission to the engine intake. Cooler 75 is sometimes termed an after-cooler or charge-cooler.

COOLANT AIR SUPPLY MEANS

The supercharger, as thus far described, may be considered conventional. I propose to modify the supercharger by adding an air passage means 76 upstream from compressor inlet 68 (for supplying coolant air to the coolant passages surrounding the engine cylinder). An axial flow fan 77 is arranged within passage means 76 for conjoint rotation with turbine 58 and impeller 64; for this purpose, shaft 62 may be extended leftwardly beyond impeller 64 to a driving connection with fan 77.

Fan 77 rotation imparts a swirling motion to the air as it is drawn through passage 76. A scroll-type collector 78 is arranged at the fan discharge to remove a portion of the swirling air before it can reach impeller 64. Collector 78 may include an annular wall 80 whose internal diameter is slightly less than the diameter of passage 76 and fan 77. Wall 80 directs the outer ring of swirling air into collector 78. Collector action is enhanced by the effect of centrifugal force associated with the air swirl action.

Air that is not trapped by collector 78 travels through convergent passage section 76a and thence into impeller 64. The swirl imparted to the air by fan 77 detracts from impeller 64 performance in that it increases the residence time in the impeller and reduces the mass flow rate. Therefore, anti-swirl (air straightener) vanes 81 are provided in passage section 76a.

Scroll-type collector 78 supplies coolant (air) to all cylinders of the engine. The coolant supply system preferably is designed so that the total air flow is apportioned equally to the various cylinders of the engine. Preferably, the coolant is used to cool not only the engine cylinders but also the pressurized combustion air and the engine lubricating oil. The coolant air is therefore passed through an air cooler 75 and oil cooler 84 prior to its admission to the engine cylinders. Separation of the total coolant air flow into individual cylinder coolant streams takes place after passage through air cooler 75 and oil cooler 84.

Scroll-type collector 78 connects with a conduit-means 83 that connects with two branch conduits 83a and 83b leading respectively through air cooler 75 and lubricating oil cooler 84. Branches 83a and 83b rejoin prior to connection with manifold 89. Each branch conduit 83a or 83b delivers air (coolant) through flow channels in cooler 75 or 84 for performing coolant functions on the compressed air and engine lubricating oil flowing through the respective coolers.

Various mechanisms could be devised to control air flow through conduit 83, if necessary. The drawings show a first valve 86 and a second valve 87. Valve 86 may be controlled by the temperature in engine exhaust line 54 so that maximum air is delivered through conduit 83 as the line 54 temperature increases in accordance with high engine coolant loadings. Valve 87 may be controlled by the outlet oil temperature in oil cooler 84 so that maximum air is delivered through branch line 83b when necessary to prevent excessively high oil temperatures. Various control systems are available if required. An optimum circuit design may eliminate the need for such complexities.

Manifold 89 has various outlet conduits leading to coolant passages for the various engine cylinders. Each cylinder preferably includes a coolant intake fitting 85.

COOLANT FLOW THROUGH ENGINE CYLINDER

Coolant air is channeled around cylinder 28 by means of a tubular shroud 14 (extending between cylinder head 43 and cylinder flange 16). The cylinder wall has a number of helical fins 18 extending therearound for causing the air to flow completely around the cylinder wall during its passage from the lower end of the cylinder to the upper end of the cylinder.

Each helical fin may make one or more revolutions around the cylinder to provide a long coolant residence time in the engine; the number of helical fins would have to be determined by experimentation, taking into account the heat load and pressure drop. The fins divide the total coolant flow into a series of separate helical streams (each of which experiences a pressure drop).

The coolant air is discharged from the fin 18 passages into an annular space 19 at the upper end of cylinder 28. Before discharge out of the cylinder, the coolant air is caused to flow through passages 20 that extend within head 43 around exhaust passage 45 and intake passage 45. Preferably, passages 20 are oriented to direct coolant flow across those engine walls having the highest operating temperatures, e.g., cylinder end wall 37 and exhaust passage 45. Passages 20 are defined by a cavity formed in the undersurface of head 43.

Coolant air is exhausted from cavity 20 of the engine cylinder through an exit port 22.

The passage system (defined by fins 18 and cavity passage 20) is preferably designed so that coolant air is caused to flow along the hot surfaces at a fairly high linear flow rate. The heat transfer rate may be somewhat increased (improved) by providing heat transfer fins on the external surfaces of cylinder 28 and exhaust passage 47. Such fins are designated by numerals 21 and 23 in the drawing. The fins may not be necessary or desirable in all areas, e.g., around cylinder 28.

Spent coolant is discharged through port 22 into a conduit 24. Conduit 24 directs the air to any suitable zone for convenient discharge out of the vehicle. As shown in the drawing, conduit 24 connects to an annular manifold 25 suitably affixed to turbine housing 50. As the engine exhaust gases are discharged through turbine outlet passage 60 the coolant air is drawn from manifold 25 through openings 53 into the exhaust gas stream. The exhaust gas stream is (or may be) somewhat cooled; for military vehicles this may be advantageous in minimizing the infra-red image presented to the enemy force.

GENERAL COOLANT FLOW

By way of summarization, coolant air is initially taken into the vehicle as part of the air stream flowing toward compressor element 64. Scroll-type collector 78 diverts the coolant air from the main air stream.

Coolant air is passed through air cooler 75 and oil cooler 84 before admission to an air manifold 89. The manifold apportions the coolant air to the individual cylinders of the engine.

The coolant air has a helical motion as it flows from air intake 85 along the outer surface of cylinder 28. Coolant air travels through passage cavity 20 in heat transfer contact with cylinder end wall 37 and the external surfaces of passage members 45 and 47.

Spent coolant is exhausted through port 22 into duct 24 for eventual discharge out of the engine via manifold 25 or similar means.

FEATURES OF THE INVENTION

A principal feature of the invention is the "all-air" nature of the cooling system. No water or other liquid coolant is required. Coolant air can be used not only to cool the engine but also to cool the lubricating oil and the engine charge air.

The air passage system is such that it uses only the pre-existing inlet and outlet openings required for engine operation, i.e., one opening for passage means 76 and a second opening for turbine outlet 60. This is an advantage in the case of military vehicles where an excessive number of openings would detract from desired armor protective action.

Another advantage of the illustrated system is believed to be an improved control of the coolant air flow. The coolant air is completely channeled or directed while it is moving from collector 78 through the engine to outlet manifold 25. This is in contrast to known air-cooled engine systems wherein the air is blown across external fins on the engine cylinders. In such known systems, the air flow cannot be concentrated into the high heat flux areas; the air circulates within the engine compartment in a relatively uncontrolled fashion.

Another advantage of the invention is a significant reduction of the cooling air flow rate compared to conventional air and water-cooled engines. This means the ducting and grilles required can be materially reduced in size, leaving this space for other functions.

In my proposed arrangement the coolant air is circulated completely around each cylinder in direct contact with a cylinder liner wall 28 and internal cylinder head surfaces. Creation of localized hot spots is minimized.

U.S. Pat. No. 4,348,991 to J. H. Stang, et.al., shows an engine coolant system wherein coolant is circulated around an engine cylinder in direct contact with a cylinder liner wall. However, in the Stang et. al. arrangement, the coolant is oil, not air. A special system of oil-to-water heat exchangers and water-to-air heat exchangers is required under the Stang et.al. concept. My proposed system is believed to be materially simpler than the system proposed in the Stang et.al. patent.

DESIGN VARIATIONS

The drawing shows the invention applied to an engine wherein individual cylinders are bolted onto face areas of an engine crankcase. The invention could also be applied to the type of engine wherein the cylinders are formed as bored-out cavities in a cylinder block. The cylinders could take the form of cylindrical liners insertable into the bored-out cavities.

The drawing shows an arrangement wherein fan 77 is driven by the turbine 58 - compressor 64 assembly. It is conceivable that fan 77 could be driven from an auxiliary turbine (separate from turbine 58). In that event, shaft 62 would be constructed as annular sleeve member. Fan 77 would be connected to the auxiliary turbine via a shaft extending co-axially through hollow shaft 62. Such an arrangement would permit fan 77 to operate at a different r.p.m. than compressor impeller 64.

The drawing shows air cooler 75 and oil cooler 84 arranged in parallel flow relationship to one another (as regards coolant flow). Other arrangements are possible. For example, it might be possible to arrange the coolers in series flow relationship. Also, if the coolant flow requirements for air cooler 75 should be higher than coolant flow requirements for the engine, then some of the coolant air discharged from cooler 75 can be diverted around the engine cylinders.

The drawing shows an arrangement wherein the spent coolant is exhausted into the gaseous stream being exhausted through turbine outlet passage 60. It is possible to discharge spent coolant from the vehicle through other openings or passages in the hull envelope. However, use of passage 60 as a coolant discharge point is desirable for minimizing the number of openings in the hull wall. In the case of armored military vehicles, it is preferred to have as few openings (interruptions) as possible in the armored walls.

The invention is believed to have most application to supercharged engines wherein the supercharger provides pressurized paths for combustion air and exhaust gases. However, the invention could conceivably be used in non-supercharged engines. In that event, fan means could be driven from the engine to provide a pressurized source of coolant air. A conduit system would be used to transmit the coolant air from the fan means to each coolant intake fitting 85 (or manifold 89).

I wish it to be understood that I do not desire to be limited to the exact details of construction shown and described for obvious modifications will occur to a person skilled in the art, without departing from the spirit and scope of the appended claims.

I claim:

1. In a vehicle power plant that includes a piston engine having a plurality of combustion cylinders, each engine cylinder comprising an end wall (37), annular side wall 28, combustion air intake passage means (45) connected to the cylinder end wall, and an exhaust passage means (47) extending from the cylinder end wall for exhausting products of combustion from the combustion cylinder: the improvement comprising novel means for cooling the engine cylinders; said cooling means comprising a coolant chamber surrounding each engine cylinder; a fan means (77); a first conduit means for transmitting coolant air from the fan means to the individual coolant chambers; a second conduit means (24) for directing spent coolant air from the individual coolant chambers to an area external to the vehicle; said cooling means being a completely confined system wherein all of the engine coolant air is sealed from escape while traveling through the first conduit means, the engine cylinders, and the second conduit means; each coolant chamber being defined by an annular shroud wall (14) surrounding the cylinder side wall, and a head member (43) overlying the cylinder end wall;

said annular shroud wall having a connection (85) with the first conduit means, and the head member having a connection (22) with the second conduit means;

a plural number of heat-conducting fins (18) (23) extending outwardly from the cylinder side wall in the annular space circumscribed by the annular shroud wall (14); said fins having leading ends spaced from the aforementioned connection (85) with the first conduit means whereby coolant air is divided into a series of separate streams during flow through the space circumscribed by the shroud wall;

the aforementioned head member (43) having an interior surface defining a cavity (20) in open communication with the outer surface of the cylinder end wall; said cavity including a peripheral space (19) in open communication with the annular space circumscribed by the aforementioned shroud wall, whereby coolant air flows into the cavity through the peripheral space; said cavity being configured to provide an air passage in surrounding relation to the aforementioned intake passage means and exhaust passage means; said cavity (20) including a cavity surface spaced only a slight distance from the cylinder end wall in the vicinity of the intake passage means so that coolant air is caused to flow generally parallel to the end wall surface as it moves toward the aforementioned connection (22) with the second conduit means; the cavity surface in the vicinity of the exhaust passage means being spaced from the cylinder end wall to expose the exterior surface of the exhaust passage means to the cavity, and heat transfer fins (21) on the exposed surface of the exhaust passage means; the aforementioned connection with the second conduit means being located so that coolant air is caused to flow over the heat transfer fins on the exhaust passage means to reach the second conduit means.

* * * * *